US012790190B2

(12) United States Patent
Zhang et al.

(10) Patent No.: US 12,790,190 B2
(45) Date of Patent: Nov. 10, 2026

(54) VEHICLE FUZZY FEEDFORWARD PATH TRACKING CONTROL METHOD BASED ON HYDRAULIC STEERING LEAKAGE COMPENSATION

(71) Applicant: ANHUI HELI CO., LTD., Anhui (CN)

(72) Inventors: Donglin Zhang, Anhui (CN); Qing Cheng, Anhui (CN); Sheng Bi, Anhui (CN); Yingchun Bai, Anhui (CN); Yang Chen, Anhui (CN); Guang Xia, Anhui (CN)

(73) Assignee: ANHUI HELI CO., LTD., Anhui (CN)

( * ) Notice: Subject to any disclaimer, the term of this patent is extended or adjusted under 35 U.S.C. 154(b) by 35 days.

(21) Appl. No.: 19/116,327

(22) PCT Filed: Apr. 30, 2024

(86) PCT No.: PCT/CN2024/091018
§ 371 (c)(1),
(2) Date: Mar. 27, 2025

(87) PCT Pub. No.: WO2024/244892
PCT Pub. Date: Dec. 5, 2024

(65) Prior Publication Data
US 2026/0109583 A1 Apr. 23, 2026

(30) Foreign Application Priority Data
May 31, 2023 (CN) ........................ 202310640559.X

(51) Int. Cl.
*B66F 9/075* (2006.01)
*B62D 5/065* (2006.01)
*B62D 5/09* (2006.01)

(52) U.S. Cl.
CPC .......... *B66F 9/07568* (2013.01); *B62D 5/065* (2013.01); *B62D 5/09* (2013.01)

(58) Field of Classification Search
CPC ....... B66F 9/07568; B62D 5/06; B62D 5/065; B62D 5/09; B62D 6/007
See application file for complete search history.

(56) References Cited

U.S. PATENT DOCUMENTS 4,869,176 A * 9/1989 von Scarpatetti ...... B62D 1/265 180/401
5,101,919 A * 4/1992 Ossi ....................... B62D 11/18 180/6.7

(Continued)

FOREIGN PATENT DOCUMENTS

CN 102806941 12/2012
CN 115230805 10/2022

(Continued)

OTHER PUBLICATIONS

"International Search Report (Form PCT/ISA/210) of PCT/CN2024/091018", mailed on Jul. 8, 2024, with English translation thereof, pp. 1-4.

(Continued)

*Primary Examiner* — John Kwon
(74) *Attorney, Agent, or Firm* — JCIPRNET

(57) ABSTRACT

The present invention discloses a vehicle fuzzy feedforward path tracking control method based on hydraulic steering leakage compensation. The method comprises: acquiring the steering wheel angle, wheel angle, and piston rod displacement; outputting desired wheel and steering wheel angles in different cycles using a path tracking algorithm; obtaining a feedforward leakage compensation parameter via fuzzy control; constructing a fuzzy control system; defuzzifying it using the centroid method to yield a fuzzy sliding mode controller; comparing the actual rear wheel angle; and controlling a compensation solenoid valve to replenish fluid each cycle. These steps are repeated for subsequent cycles until the path tracking process is complete. The method (Continued)

precisely determines the feedforward compensation parameter, thus accurately controlling the solenoid valve's duty cycle to timely compensate for leakage and enhance the path tracking accuracy of intelligent vehicles.

9 Claims, 4 Drawing Sheets

(56) References Cited

U.S. PATENT DOCUMENTS

| | | | | |
|---|---|---|---|---|
| 6,442,463 | B1 | 8/2002 | Qiu et al. | |
| 2021/0043085 | A1* | 2/2021 | Kreiling | E02F 3/96 |

FOREIGN PATENT DOCUMENTS

| | | | | | |
|---|---|---|---|---|---|
| CN | 115636011 | | | 1/2023 | |
| CN | 116834829 | | | 10/2023 | |
| CN | 116834829 | A | * | 10/2023 | B66F 9/07568 |

OTHER PUBLICATIONS

"Written Opinion of the International Searching Authority (Form PCT/ISA/237) of PCT/CN2024/091018", mailed on Jul. 8, 2024, pp. 1-4.

* cited by examiner

VEHICLE FUZZY FEEDFORWARD PATH TRACKING CONTROL METHOD BASED ON HYDRAULIC STEERING LEAKAGE COMPENSATION

CROSS-REFERENCE TO RELATED APPLICATION

This application is a 371 of international application of PCT application serial no. PCT/CN2024/091018, filed on Apr. 30, 2024, which claims the priority benefit of China application no. 202310640559.X, filed on May 31, 2023. The entirety of each of the above mentioned patent applications is hereby incorporated by reference herein and made a part of this specification.

TECHNICAL FIELD

The present invention belongs to the field of path tracking control for vehicles with hydraulic steering, specifically relating to a vehicle fuzzy feedforward path tracking control method based on hydraulic steering leakage compensation.

BACKGROUND

With the advancement of technology, the application fields of fully hydraulic synchronous steering in engineering machinery, agricultural machinery, and military vehicles have become increasingly widespread, and the application environments have also become more diverse. The current trend towards comprehensive intelligence has laid the foundation for the intelligent development of various vehicles using fully hydraulic steering. Therefore, the requirements for fully hydraulic synchronous steering vehicles have shifted from functional requirements to efficiency, safety, and precision, with increasing demands on steering control capabilities.

Traditional fully hydraulic steering vehicles may experience "loss of precision" in the hydraulic steering pump due to manufacturing or installation errors and wear during use, meaning the hydraulic steering pump cannot discharge oil at the predetermined displacement. This results in inconsistency between the steered wheel angle and the steering wheel angle. For example, in a conventional hydraulic steering system, when the steered wheel angle has reached its maximum, the steering wheel can still slide a certain distance in the direction of the turn due to leakage, and when returning to straight-line driving, the steering wheel angle deviates from the previous straight-line position, failing to achieve synchronization between the steering wheel and the vehicle wheels. Such leakage disturbances in the steering actuator can cause system tracking errors, affecting the path tracking accuracy and robustness of intelligent vehicles.

The extensive application of fully hydraulic steering systems in vehicles makes the steering system accuracy during path tracking undoubtedly one of the most concerning issues in the intelligent vehicle research of construction vehicles, military vehicles, agricultural vehicles and other vehicles equipped with fully hydraulic steering systems. The decisive factors affecting path tracking accuracy are the precision and reliability of the steering system. Therefore, improving the path tracking accuracy of such intelligent vehicles should primarily focus on research into the precision and reliability of their steering systems.

SUMMARY

To address the shortcomings of the existing technology, the present invention proposes a vehicle fuzzy feedforward path tracking control method based on hydraulic steering leakage compensation, aiming to solve the problem of poor tracking accuracy in intelligent vehicles using hydraulic steering due to steering system leakage during path tracking.

The technical solution according to the present invention to solve the technical problem is as follows:

A vehicle fuzzy feedforward path tracking control method based on hydraulic steering leakage compensation, comprising the following steps:

- Step 1: Acquiring a steering wheel angle, a wheel angle, and a piston rod displacement parameter;
- Step 2: Determining a transmission ratio $K_v$ of a hydraulic steering system of the vehicle, wherein a path tracking algorithm outputs a desired wheel angle β in different cycles, obtaining a desired steering wheel angle $\theta=\beta K_v$, and inputting the desired steering wheel angle into the hydraulic steering system of the vehicle to perform path tracking steering operations;
- Step 3: Determining a steering load force F and an actual steering angle error e(θ), and obtaining a feedforward leakage compensation parameter $K_C$ through fuzzy control;
- Step 4: Using the load force and the actual steering angle error as inputs to fuzzy rules, controlling the feedforward leakage compensation parameter as an output of the fuzzy rules, and constructing a fuzzy control system;
- Step 5: Defuzzifying the fuzzy control system using the centroid method to obtain a fuzzy sliding mode controller, and using the fuzzy sliding mode controller to perform a comparative analysis of an actually detected rear wheel angle, controlling the compensation solenoid valve to perform fluid replenishment, ensuring that the actual steering angle error of the steering system during the path tracking cycle remains within a reasonable range;
- Step 6: Performing fluid replenishment by the compensation solenoid valve for each path tracking cycle, and executing a path tracking steering operation by the vehicle hydraulic steering system;
- Step 7: Repeating the above steps 1-6 to perform calculations for a next cycle of the path tracking algorithm, completing an entire path tracking process.

Further, in Step 1, the steering wheel angle parameter is detected by a steering wheel angle sensor installed on a steering column of the forklift; the wheel angle parameter is detected by a wheel angle sensor installed at the rear steered wheel of the forklift; and the piston rod displacement parameter is detected by a displacement sensor installed on the steering piston rod.

Further, in Step 2, the transmission ratio $K_v$ of the hydraulic steering system is determined by specific characteristics of the steering system of the vehicle. For example, the transmission ratio of the steering system of a 3-ton intelligent forklift is $K_v=11$.

Further, the actual steering angle error e(θ) in Step 3 is a steering deviation value, which is the difference between a corresponding steering wheel angle and an actual steering wheel angle. The actual steering wheel angle is a steering wheel angle collected by the steering wheel angle sensor, and the corresponding steering wheel angle is obtained by converting the actual wheel angle collected by the wheel angle sensor using the transmission ratio of the hydraulic steering system.

Further, in Step 4, the formulation of the fuzzy rules comprises:

The feedforward leakage compensation parameter generally follows the same trend as the load force. The larger the load force, the larger the feedforward leakage compensation parameter becomes simultaneously.

When the actual steering angle error is positive, the feedforward leakage compensation parameter should increase as the absolute value of the actual steering angle error increases; when the actual steering angle error is negative, the feedforward leakage compensation parameter should decrease as the absolute value of the actual steering angle error increases.

The range of load force and actual steering angle error covers more than 95% of the possibilities. If values exceed the range (comprising maximum or minimum values), the maximum region of the corresponding linguistic variable is taken.

The steps for constructing the fuzzy control system comprise:

Step 41: Formulating the fuzzy rules and determining the relationship between the load force, the actual steering angle error, and the feedforward leakage compensation parameter;

Step 42: Determining an expression form of the fuzzy rules, dividing input and output fuzzy subsets into regions, and establishing a membership function for input and output systems to obtain the fuzzy control system.

Further, in Step 42, the dividing input and output fuzzy subsets into regions comprises a negative large region, a negative medium region, a negative small region, a zero region, a positive small region, a positive medium region, and a positive large region.

Further, in Step 3, the load force F is measured by an observer.

Further, the load force F is measured by an observer, which is achieved by tracking and measuring the piston rod displacement, and then real-time predicting the load force by combining a flow equation and a dynamic equation of a steering cylinder in the hydraulic steering system, wherein the flow equation of the steering cylinder of the hydraulic steering gear is:

$$Q_a = A_p\frac{dy}{dt} + \frac{V_t}{E}\frac{dP_7}{dt} + C_t\frac{dP_7}{dt} \quad (1)$$

The dynamic equation of the steering cylinder of the hydraulic steering gear is:

$$p_7 A_p = m_p\frac{d^2y}{dt^2} + R_p\frac{dy}{dt} + F \quad (2)$$

Where: $P_7$ is a load pressure of the steering cylinder, $A_p$ is a working cross-sectional area of the steering cylinder, $V_t$ is a cylinder volume, $m_p$ is an equivalent mass of the piston and piston rod, E is a bulk modulus of the hydraulic fluid, $R_p$ is a viscous damping coefficient of the piston, F is the load force, Y is an actual piston rod displacement; Ct is a hydraulic fluid leakage coefficient, and dt is an integral over time.

Based on the analysis of equations (1) and (2), a load force observation state variable is selected as:

$$x = [\,y \;\; \dot{y} \;\; p_7 \;\; F\,]^T \quad (3)$$

A state equation of a hydraulic steering system model is:

$$\dot{x} = Ax + Bu \quad (4)$$

$$\text{Where: } A = \begin{bmatrix} 0 & 1 & 0 \\ 0 & c_1 & c_2 \\ 0 & c_3 & c_4 \end{bmatrix},\; B = \begin{bmatrix} 0 \\ 0 \\ c_5 \end{bmatrix}$$

$$c_1 = -\frac{R_p}{m_p},\; c_2 = \frac{A_p}{m_p},\; c_3 = -\frac{EA_p}{V_t},\; c_4 = -\frac{E}{V_t}(k_{c1} + 2C_t),\; c_5 = \frac{E}{V_t}k_{q1}$$

$k_{ql}$ is a flow gain, $k_{cl}$ is a system flow-pressure coefficient, Ct is the hydraulic fluid leakage coefficient, and U is a steering wheel angle input to the system.

An observer state equation used is as follows:

$$\dot{\hat{x}} = A\hat{x} + Bu + He \quad (5)$$

Where: e is an error between the system's true state variable and the observer's estimated state, H is an coefficient of the observer, also known as an observation matrix, $H=[H_1\ H_2\ H_3\ H_4]^T$.

Assuming desired pole positions of a load force observation system are $p_1,p_2,p_3,p_4$, values of parameters $H_1,H_2,H_3,H_4$ should satisfy:

$$|sI - A| = \prod_{i=1}^{n+1}(s - p_i) \quad (6)$$

$$(s - p_1)(s - p_2)(s - p_3)(s - p_4) = 0 \quad (7)$$

By equating the coefficients of each term of the polynomial for S, values of the parameters are determined:

$$H_1 = c_1 - p_1 - p_2 - p_3 - p_4 + c_4 \quad (8)$$

$$H_2 = H_1\cdot c_1 + H_1\cdot c_4 + p_1\cdot p_2 + c_2\cdot c_3 + p_4\cdot(p_1 + p_2 + p_3\cdot(p_1 + p_2)$$

$$H_3 = \{H_2\cdot c_4 - H_4\cdot c_3 - p_4\cdot[p_1\cdot p_2 + p_3\cdot(p_1 + p_2)] + H_1\cdot c_2\cdot c_3 - p_1\cdot p_2\cdot p_3\}/c_2$$

$$H_4 = -p_1\cdot p_2\cdot p_3\cdot p_4/(c_3\cdot c_4)$$

The present invention collects the wheel angle through the wheel angle sensor, converts it using the transmission ratio of the hydraulic steering system to obtain the corresponding steering wheel angle parameter, and then calculates the difference with the actually collected steering wheel angle to obtain the actual steering angle error. Finally, the actual steering angle error is written into the fuzzy sliding mode controller along with a load force observation value. The feedforward leakage compensation parameter is obtained through the calculation of the fuzzy sliding mode controller. If the feedforward leakage compensation parameter is zero, the compensation solenoid valve is closed; if the feedforward leakage compensation parameter is not zero, the compensation solenoid valve is opened, and the duty cycle of the compensation solenoid valve is adjusted to achieve feedforward compensation for the leakage fluid during path tracking, improving path tracking accuracy. The steering cylinder outputs the corresponding hydraulic fluid for the steering mechanism to operate.

Compared with the prior art, the beneficial effects of the present invention are:

1. The present invention uses a feedforward approach combined with a fuzzy sliding mode controller to compensate for hydraulic steering system leakage in advance. The compensation adjustment can be performed before the leakage disturbance occurs, which does not affect the path tracking process of the next cycle and improves the path tracking accuracy of the intelligent vehicle.

2. The fuzzy control according to the present invention, using the steering load force and the actual steering angle error as inputs, accurately determines the feedforward compensation parameter, thereby controlling the duty cycle of the compensation solenoid valve to precisely and timely compensate for the leakage fluid.

3. The present invention proposes that the load force is measured by the observer. The observer can convert the time-varying load force, which is difficult to observe directly during the steering process, through the state equation, and observe the piston displacement to predict the load force in real time.

DETAILED DESCRIPTION

Figure 1:
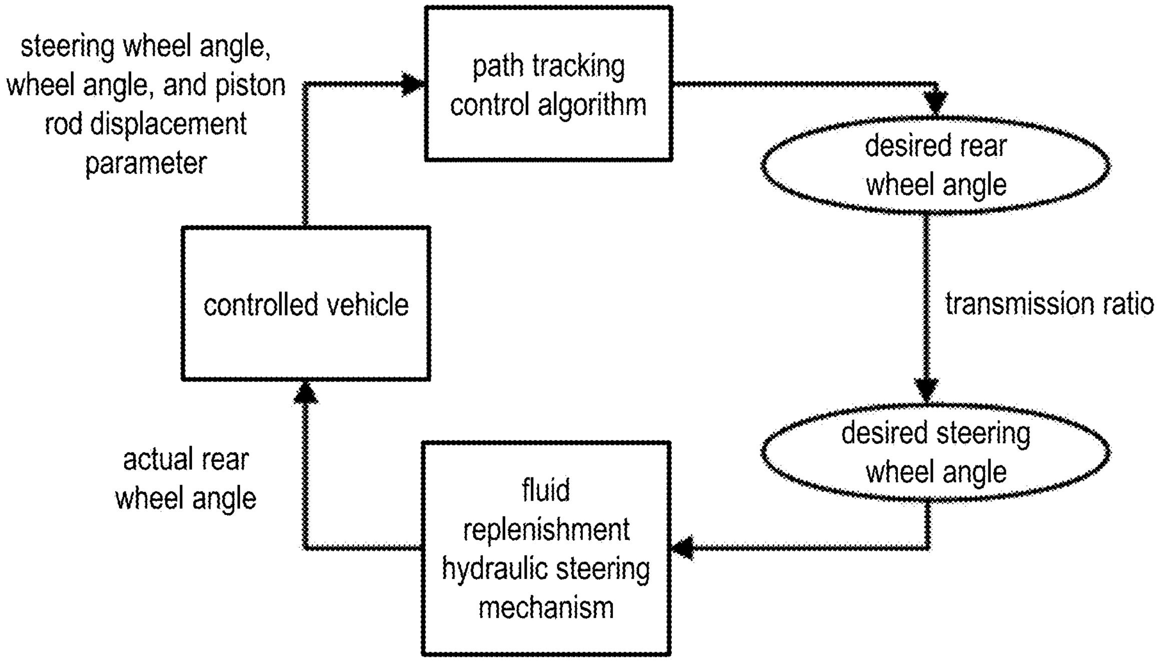
FIG. 1 is a path tracking process based on hydraulic steering leakage compensation of the present invention.

The technical solutions in the embodiments of the present invention will be clearly and completely described below with reference to the accompanying drawings. It is evident that the described embodiments are merely some, but not all, of the embodiments of the present invention. Based on the embodiments of the present invention, all other embodiments obtained by those skilled in the art without inventive labor belong to the protection scope of the present invention.

Embodiment 1

In this embodiment, a vehicle fuzzy feedforward path tracking control method based on hydraulic steering leakage compensation is applied to an intelligent vehicle equipped with an actuator. The actuator comprises a hydraulic active steering actuator, which comprises a compensation solenoid valve. The solenoid valve is connected to an inlet of a hydraulic cylinder, and both ends of the hydraulic cylinder are connected to a vehicle body and a steering axle, respectively. The control method is performed as follows:

Step 1: Installing a steering wheel angle sensor on a steering column of a forklift to obtain a steering wheel angle parameter;

Installing a wheel angle sensor at a (rear) steered wheel of the forklift to obtain a wheel angle parameter;

Installing a displacement sensor on a steering piston rod to obtain a piston rod displacement parameter y;

Step 2: Determining a transmission ratio $K_v$ of a hydraulic steering system, where the transmission ratio $K_v$ of the hydraulic steering system is determined by specific characteristics of the vehicle's steering system. The transmission ratio of the steering system varies for different vehicle models. The path tracking algorithm outputs a desired wheel angle β in different cycles, and the desired wheel angle is converted to a desired steering wheel angle $\theta=\beta K_v$, according to the transmission ratio $K_v$ of the hydraulic steering system, which is then input into the hydraulic steering system of the forklift to perform path tracking steering operations;

Step 3: Determining a steering load force F and an actual steering angle error e(θ), and establishing a fuzzy relationship between the load force F and the actual steering angle error e(θ) with a feedforward leakage compensation parameter $K_C$ through fuzzy control;

Step 31: Determining the actual steering angle error value as follows: An actual wheel angle $\beta_a$ is collected by the wheel angle sensor and converted by the system transmission ratio to obtain a corresponding steering wheel angle $\theta_a$. An actual steering wheel angle $\theta_b$ is collected by the steering wheel angle sensor. The difference between the corresponding steering wheel angle and the actual steering wheel angle is the steering deviation value, i.e., $e(\theta)\theta_b-\theta_a$, Step 32: Determining the steering load force F by an observer, and the observation steps of the observer are as follows:

The observer tracks and measures the easily measurable piston rod displacement, and then combines the flow equation and the dynamic equation of the steering system cylinder to real-time predict the inconveniently observed load force, wherein:

The flow equation of the steering cylinder of the hydraulic steering gear is:

$$Q_a = A_p\frac{dy}{dt} + \frac{V_t}{E}\frac{dP_7}{dt} + C_t\frac{dP_7}{dt} \tag{1}$$

The dynamic equation of the steering cylinder is:

$$p_7A_p = m_p\frac{d^2y}{dt^2} + R_p\frac{dy}{dt} + F \tag{2}$$

Where: $P_7$ is a load pressure of the steering cylinder, $k_{ql}$ is a flow gain, d is a steering valve spool diameter, $A_p$ is a working cross-sectional area of the steering cylinder, $D_m$ is a theoretical displacement of the hydraulic motor, $V_t$ is a cylinder volume, $m_p$ is an equivalent mass of the piston and piston rod, E is a bulk modulus of the hydraulic fluid, $R_p$ is a viscous damping coefficient of the piston, F is the load force, and Y is the actual piston rod displacement.

Based on the analysis of equations (1) and (2), a load force observation state variable is selected as:

$$x = [\,y \quad \dot{y} \quad p_7 \quad F\,]^T \tag{3}$$

A state equation of a hydraulic steering system model is:

$$\dot{x} = Ax + Bu \tag{4}$$

-continued $$\text{Where: } A = \begin{bmatrix} 0 & 1 & 0 \\ 0 & c_1 & c_2 \\ 0 & c_3 & c_4 \end{bmatrix}, B = \begin{bmatrix} 0 \\ 0 \\ c_5 \end{bmatrix},$$

$$c_1 = -\frac{R_p}{m_p}, c_2 = \frac{A_p}{m_p}, c_3 = -\frac{EA_p}{V_t}, c_4 = -\frac{E}{V_t}(k_{cl} + 2C_V), c_5 = \frac{E}{V_t}k_{ql}$$

An observer state equation used is as follows:

$$\hat{\dot{x}} = A\hat{x} + Bu + He \quad (5)$$

Where: e is an error between the system's true state variable and the observer's estimated state, u is a system input (steering wheel angle), H is an coefficient of the observer, also known as an observation matrix $H[H_1\ H_2\ H_3\ H_4]^T$.

The determination of the observation matrix determines whether the state estimation error of the system under Luenberger observation can decay to zero, making the system tend to a stable state. Matrices A and B are determined by the system characteristics, so the necessary condition for the system to be asymptotically stable is that the characteristic roots (system poles) of the observation matrix H all lie in the left half of the complex plane. Therefore, the parameter $H=[H_1\ H_2\ H_3\ H_4]^T$ must ensure that the characteristic roots of the observation matrix H all lie in the left half of the complex plane and that their real parts are sufficiently negative.

Assuming desired pole positions of a load force observation system are $p_1, p_2, p_3, p_4$, values of parameters $H_1, H_2, H_3, H_4$ should satisfy:

$$|sI - A| = \prod_{i=1}^{n+1}(s - p_i) \quad (6)$$

$$(s - p_1)(s - p_2)(s - p_3)(s - p_4) = 0 \quad (7)$$

By equating the coefficients of each term of the polynomial for s, values of the parameters are determined:

$$H_1 = c_1 - p_1 - p_2 - p_3 - p_4 + c_4 \quad (8)$$

$$H_2 = H_1 \cdot c_1 + H_1 \cdot c_4 + p_1 \cdot p_2 + c_2 \cdot c_3 + p_4 \cdot (p_1 + p_2 + p_3) + p_3 \cdot (p_1 + p_2)$$

$$H_3 = \{H_2 \cdot c_4 - H_4 \cdot c_3 - p_4 \cdot [p_1 \cdot p_2 \cdot p_3 \cdot (p_1 + p_2)] + H_1 \cdot c_2 \cdot c_3 - p_1 \cdot p_2 \cdot p_3\}/c_2$$

$$H_4 = -p_1 \cdot p_2 \cdot p_3 \cdot p_4/(c_3 \cdot c_4).$$

Figure 3:
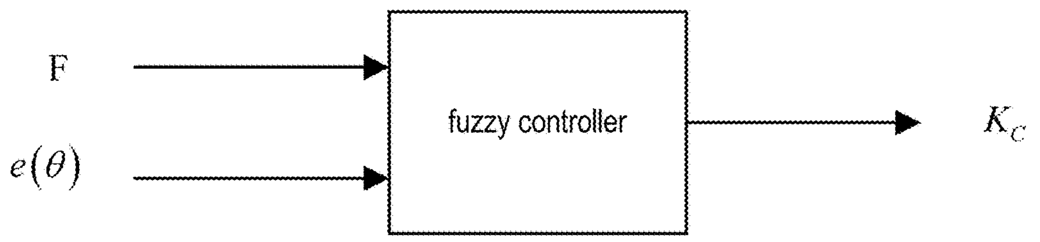
FIG. 3 is a schematic diagram of the input and output of the fuzzy controller of the present invention.

Step 4: Using the load force F and the actual steering angle error e(θ) as inputs to fuzzy rules, controlling the feedforward leakage compensation parameter Kc as an output of the fuzzy rules, and constructing a fuzzy control system. The input and output of the fuzzy logic controller are shown in FIG. 3. The steps for constructing the fuzzy control system comprise:

Step 41: Formulating the fuzzy rules and determining the relationship between the input load force and actual steering angle error with the feedforward leakage compensation parameter. The relationship in this specification is $\Psi(K_C)$=fuzzy(F,e(θ))

Step 42: Determining an expression form of the fuzzy rules, which is:

Rule: IF "F" is "$u_i$" AND "e(θ)" is "$u_j$" THEN "Ψ" is "

$$u_{ij}^{K_C}",$$

The specific rules are as follows:

The feedforward leakage compensation parameter generally follows the same trend as the load force. The larger the load force, the larger the feedforward leakage compensation parameter becomes simultaneously.

When the actual steering angle error is positive, the feedforward leakage compensation parameter should increase as the absolute value of the angle error increases; when the actual steering angle error is negative, the feedforward leakage compensation parameter should decrease as the absolute value of the angle error increases:

The range of load force and angle error covers more than 95% of the possibilities. If values exceed the range (comprising maximum or minimum values), the maximum region of the corresponding linguistic variable is taken.

Figure 2:
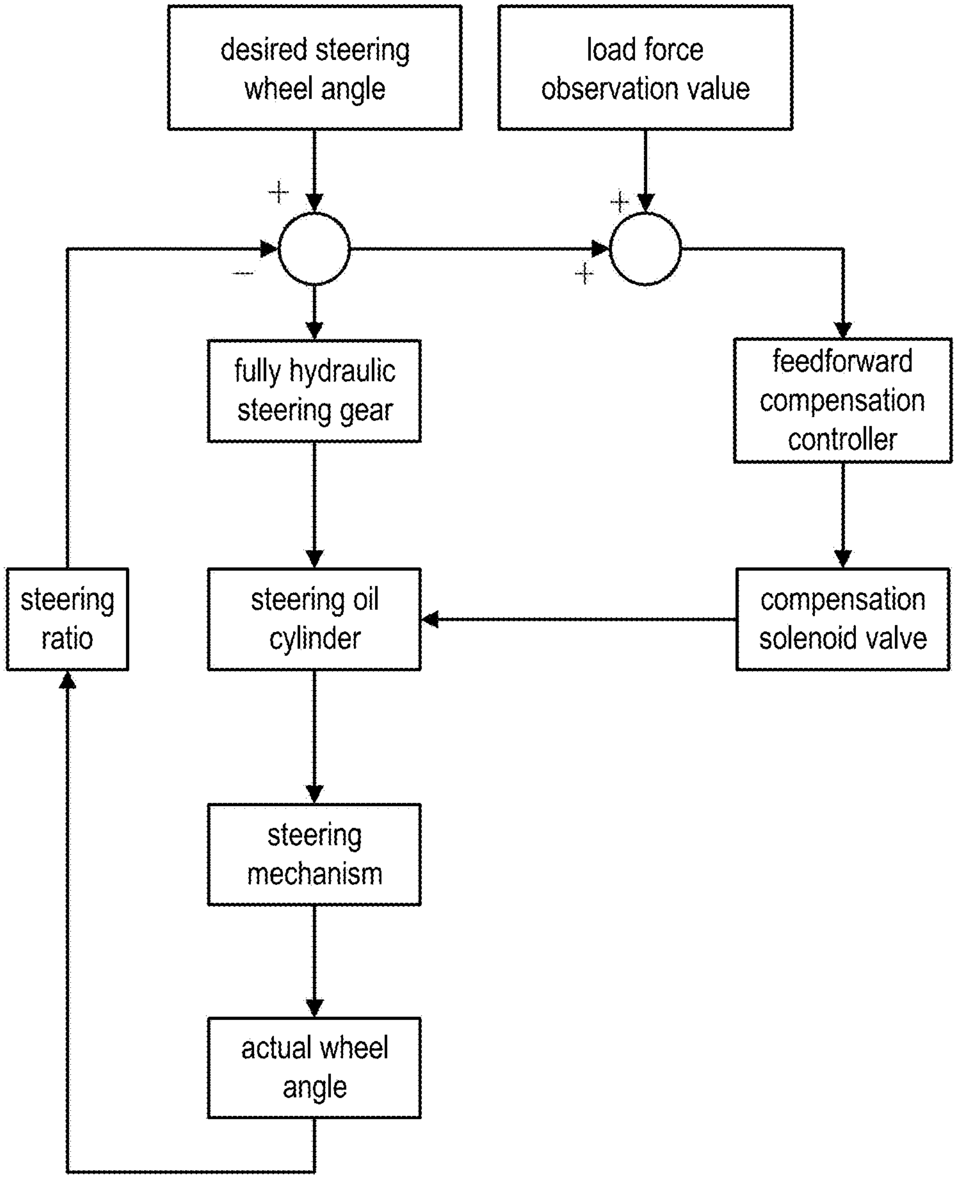
FIG. 2 is a schematic diagram of the oil compensation principle of the present invention.
Figure 4:
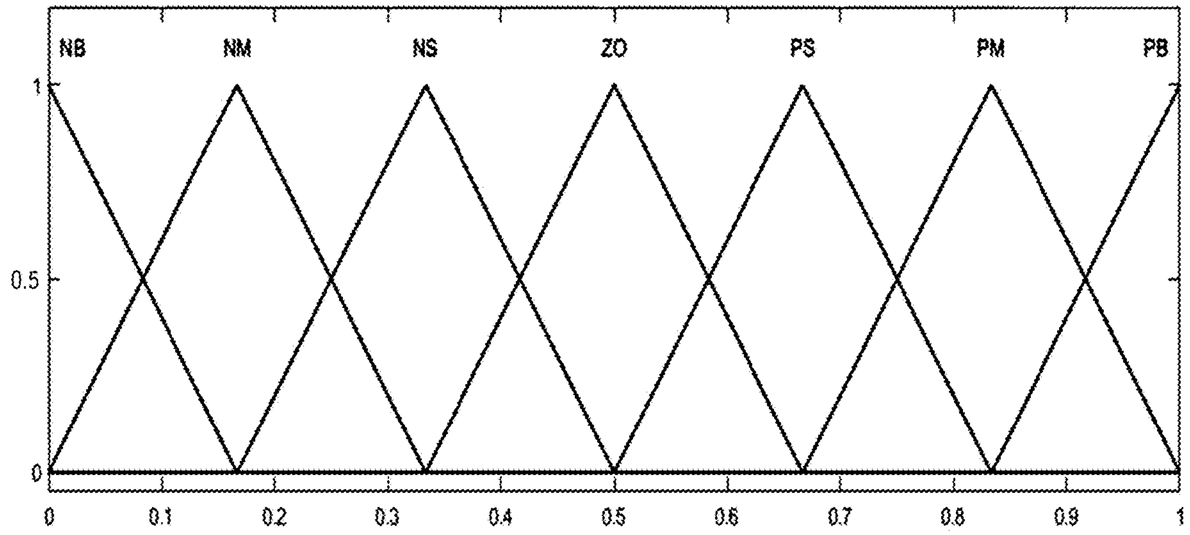
FIG. 4 is the membership function diagram of the input and output systems of the present invention.

The input and output fuzzy subsets are divided into regions comprises a negative large region, a negative medium region, a negative small region, a zero region, a positive small region, a positive medium region, and a positive large region; thus, the fuzzy control has more range options and is more precise. The membership functions of the input and output systems are established, as shown in FIG. 4;

Step 5: Defuzzifying the fuzzy control system using the centroid method to obtain a fuzzy sliding mode controller, controlling the compensation solenoid valve to perform fluid replenishment, ensuring that the actual steering angle error of the steering system during the path tracking cycle remains within a reasonable range. The specific compensation principle is shown in FIG. 2: During path tracking, when performing steering leakage compensation control, the wheel angle collected by the wheel angle sensor is first converted using a fixed steering ratio and calculated with the steering wheel angle to obtain the actual steering angle error. The actual steering angle error and the load force observation value are then written into the fuzzy sliding mode controller, which calculates the feedforward leakage compensation parameter. If the feedforward leakage compensation parameter is zero, the compensation solenoid valve is closed; if the feedforward leakage compensation parameter is not zero, the compensation solenoid valve is opened, and the duty cycle of the compensation solenoid valve is adjusted to achieve feedforward compensation for the leakage fluid during path tracking, improving the accuracy of path tracking. The steering cylinder outputs a corresponding hydraulic fluid for the steering mechanism to operate.

The expression of the fuzzy sliding mode controller is:

$$\Psi(K_C) = \frac{\sum_{i=1}^{n}\sum_{j=1}^{m} f_{ij}(F, e(\theta)) \cdot u_{ij}^{K_C}}{\sum_{i=1}^{n}\sum_{j=1}^{m} f_{ij}(F, e(\theta))},$$

where the value of $$u_{ij}^{K_C}$$

is determined by the aforementioned fuzzy rules.

Step 6: Compensating for hydraulic steering system leakage during the path tracking cycle by replenishing oil through the compensation solenoid valve; Information such as the vehicle's kinematics and position parameters after the vehicle's hydraulic steering system performs the path tracking steering operation will then be input into the calculation of the next cycle of the path tracking algorithm to form a closed loop, completing the entire path tracking process. The specific closed-loop tracking process is shown in FIG. 1.

Embodiment 2

The fuzzy feedforward path tracking control method for hydraulic steering leakage compensation of the present invention is applied to a certain type of 3-ton intelligent forklift. The parameters of the hydraulic steering system of the intelligent forklift are shown in the table below:

TABLE

Hydraulic Steering System Parameters

| Parameter | value |
|---|---|
| Kingpin center distance (Z) | 810 mm |
| Arm length ($R_a$) | 107 mm |
| Link length ($L_0$) | 95.2 mm |
| Steering cylinder piston rod length (D) | 60 mm |
| Trapezoidal base angle supplement ($\phi_0$) | 58° |
| Steering cylinder external offset distance ($E_a$) | 56.7 mm |
| Hydraulic fluid viscosity (μ) | 0.05 Pa*s |
| Steering cylinder piston viscous damping coefficient ($R_P$) | 5000 N*s/m |
| Bulk modulus (E) | $7 \times 10^8$ Pa |
| Steering gear arc displacement (q) | $3 \times 10^{-2}$ Pa |
| Steering cylinder working area ($A_P$) | 0.007 $m^2$ |
| Steering cylinder volume ($V_t$) | $4.2 \times 10^{-3}$ $m^3$ |
| Steering valve spool diameter (d) | 0.022 m |
| Steering gear gap height (h) | 10 μm |
| Flow gain ($k_{q1}$) | 0.82 |
| Hydraulic fluid density (ρ) | 850 kg/m3 |
| Equivalent mass of piston and piston rod ($m_p$) | 12 kg |
| Elastic stiffness coefficient (k) | $2.5 \times 10^9$ N/m |
| Steering cylinder leakage coefficient ($C_V$) | $4.7 \times 10^{-13}$ $m^3$/Pa |

The process of hydraulic fluid leakage compensation during the forklift's path tracking is as follows:

Step 1: Based on the path tracking algorithm in a certain path tracking cycle, calculating a desired wheel angle β=22° and subsequently converting it to a desired steering wheel angle parameter θ=242° via the transmission ratio $K_v$=11 of the steering system;

Step 2: Collecting an actual wheel angle $\beta_a$=23°, and obtaining a corresponding steering wheel angle parameter $\theta_a$=253° according to the transmission ratio $K_C$=11 of the steering system; collecting an actual steering wheel angle $\theta_b$=θ=242°, thus obtaining an actual steering angle error e(θ)=11'.

Figure 5A:
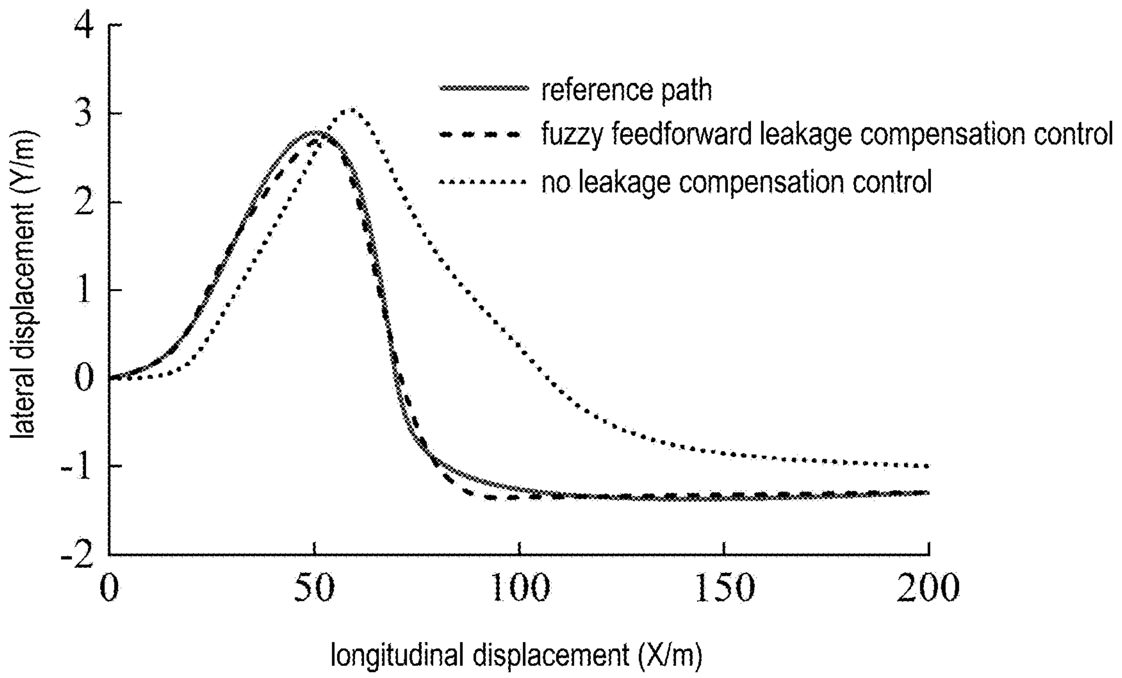
FIG. 5A is a comparative diagram of path tracking of the present invention.
Figure 5B:
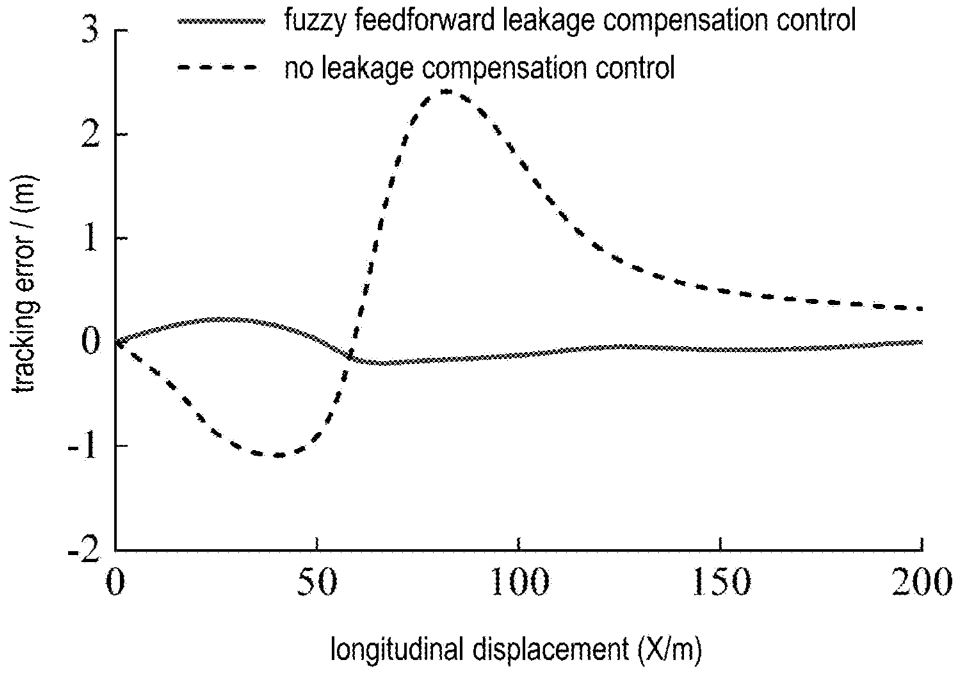
FIG. 5B is a comparative diagram of path tracking error of the present invention.

Step 3: Collecting a real-time load force F=2320N by an observer;

Step 4: Calculating a feedforward leakage compensation parameter $K_C$=0.33 at this time through fuzzy control;

Step 5: Constructing a fuzzy control system based on the load force, the actual steering angle error, and the feedforward leakage compensation parameter;

Step 6: Opening the compensation solenoid valve and using the fuzzy sliding mode controller to control its opening based on the actual rear wheel angle, for example, the fuzzy sliding mode controller outputting a 33% duty cycle PWM control signal to the hydraulic fluid compensation solenoid valve for fluid replenishment;

Step 7: Repeating the above steps in each cycle for closed-loop path tracking control. The comparison of path tracking with and without leakage compensation and the tracking error comparison are shown in FIGS. 5A and B. From the figures, it can be seen that the forklift fuzzy feedforward path tracking control algorithm based on hydraulic steering leakage compensation according to the present invention exhibits excellent tracking performance, with the peak tracking error being less than 0.25 m. In contrast, the path tracking performance without full hydraulic steering system leakage compensation is poor. Due to leakage, the wheel angle cannot fully respond to the desired steering wheel angle during steering, resulting in a constant understeer state. As a result, the tracking error cannot be compensated throughout the entire path tracking process, with the peak tracking error reaching 2.385 m, significantly deviating from the reference path.

In summary, the forklift fuzzy feedforward path tracking control method based on hydraulic steering leakage compensation according to the present invention can effectively compensate for hydraulic steering system leakage during the path tracking process of intelligent forklifts, improving the path tracking accuracy of intelligent forklifts.

Although the present specification is described in terms of embodiments, it is not intended that each embodiment includes only one independent technical solution. This narrative mode of the specification is merely for the sake of clarity. Those skilled in the art should understand the specification as a whole, and the technical solutions in the various embodiments can also be appropriately combined to form other embodiments that can be understood by those skilled in the art.

Therefore, the above description is only a preferred embodiment of the present application and is not intended to limit the scope of the present application; that is, all equivalent variations made within the scope of the claims of the present application shall fall within the protection scope of the claims of the present application.

What is claimed is:

1. A vehicle fuzzy feedforward path tracking control method based on hydraulic steering leakage compensation, comprising:

Step 1: acquiring a steering wheel angle, a wheel angle, and a piston rod displacement parameter;

Step 2: determining a transmission ratio $K_v$ of a hydraulic steering system of the vehicle, wherein a path tracking algorithm outputs a desired wheel angle β in different cycles, obtaining a desired steering wheel angle $\theta=\beta K_v$, and inputting the desired steering wheel angle into the hydraulic steering system of the vehicle to perform path tracking steering operations;

Step 3: determining a steering load force F and an actual steering angle error e(θ), and obtaining a feedforward leakage compensation parameter $K_c$ through fuzzy control;

Step 4: using the load force and the actual steering angle error as inputs to fuzzy rules, controlling the feedforward leakage compensation parameter as an output of the fuzzy rules, and constructing a fuzzy control system;

Step 5: defuzzifying the fuzzy control system using the centroid method to obtain a fuzzy sliding mode controller, and using the fuzzy sliding mode controller to perform a comparative analysis of a rear wheel angle, controlling the compensation solenoid valve to perform fluid replenishment, ensuring that the actual steering angle error of the steering system during the path tracking cycle remains within a reasonable range;

Step 6: performing fluid replenishment by the compensation solenoid valve for each path tracking cycle, and executing a path tracking steering operation by the vehicle hydraulic steering system;

Step 7: repeating the above steps 1-6 to perform calculations for a next cycle of the path tracking algorithm, completing an entire path tracking process.

2. The vehicle fuzzy feedforward path tracking control method based on hydraulic steering leakage compensation according to claim 1, wherein in Step 1, the steering wheel angle parameter is detected by a steering wheel angle sensor installed on a steering column of the forklift; the wheel angle parameter is detected by a wheel angle sensor installed at the rear steered wheel of the forklift; and the piston rod displacement parameter is detected by a displacement sensor installed on the steering piston rod.

3. The vehicle fuzzy feedforward path tracking control method based on hydraulic steering leakage compensation according to claim 1, wherein in Step 2, the transmission ratio $K_v$ of the hydraulic steering system is determined by specific characteristics of the steering system of the vehicle.

4. The vehicle fuzzy feedforward path tracking control method based on hydraulic steering leakage compensation according to claim 1, wherein in Step 3, the load force F is measured by an observer.

5. The vehicle fuzzy feedforward path tracking control method based on hydraulic steering leakage compensation according to claim 1, wherein the actual steering angle error e(θ) in Step 3 is a steering deviation value, which is the difference between a corresponding steering wheel angle and an actual steering wheel angle, where the actual steering wheel angle is a steering wheel angle collected by the steering wheel angle sensor, and the corresponding steering wheel angle is obtained by converting the actual wheel angle collected by the wheel angle sensor using the transmission ratio of the hydraulic steering system.

6. The vehicle fuzzy feedforward path tracking control method based on hydraulic steering leakage compensation according to claim 1, wherein in Step 4, the formulation of the fuzzy rules comprises:

the feedforward leakage compensation parameter generally follows the same trend as the load force; the larger the load force, the larger the feedforward leakage compensation parameter becomes simultaneously;

when the actual steering angle error is positive, the feedforward leakage compensation parameter should increase as the absolute value of the actual steering angle error increases; when the actual steering angle error is negative, the feedforward leakage compensation parameter should decrease as the absolute value of the actual steering angle error increases.

7. The vehicle fuzzy feedforward path tracking control method based on hydraulic steering leakage compensation according to claim 1, wherein in Step 4, the steps for constructing the fuzzy control system comprise:

Step 41: formulating the fuzzy rules and determining the relationship between the load force, the actual steering angle error, and the feedforward leakage compensation parameter;

Step 42: determining an expression form of the fuzzy rules, dividing input and output fuzzy subsets into regions, and establishing a membership function for input and output systems to obtain the fuzzy control system.

8. The vehicle fuzzy feedforward path tracking control method based on hydraulic steering leakage compensation according to claim 7, wherein in Step 42, the dividing input and output fuzzy subsets into regions comprises a negative large region, a negative medium region, a negative small region, a zero region, a positive small region, a positive medium region, and a positive large region.

9. The vehicle fuzzy feedforward path tracking control method based on hydraulic steering leakage compensation according to claim 4, wherein the load force F is measured by an observer, which is achieved by tracking and measuring the piston rod displacement, and then real-time predicting the load force by combining a flow equation and a dynamic equation of a steering cylinder in the hydraulic steering system, wherein the flow equation of the steering cylinder of the hydraulic steering gear is:

$$Q_a = A_p\frac{dy}{dt} + \frac{V_t}{E}\frac{dP_7}{dt} + C_t\frac{dP_7}{dt} \tag{1}$$

the dynamic equation of the steering cylinder of the hydraulic steering gear is:

$$p_7 A_p = m_p\frac{d^2y}{dt^2} + R_p\frac{dy}{dt} + F \tag{2}$$

Where: $P_7$ is a load pressure of the steering cylinder, $A_p$ is a working cross-sectional area of the steering cylinder, $V_t$ is a cylinder volume, $m_p$ is an equivalent mass of the piston and piston rod, E is a bulk modulus of the hydraulic fluid, $R_p$ is a viscous damping coefficient of the piston, F is the load force, y is the actual piston rod displacement; $C_t$ is a hydraulic fluid leakage coefficient, and dt is an integral over time, based on the analysis of equations (1) and (2), a load force observation state variable is selected as:

$$x = [\,y \;\; \dot{y} \;\; p_7 \;\; F\,]^T \tag{3}$$

a state equation of a hydraulic steering system model is:

$$\dot{x} = Ax + Bu \tag{4}$$

$$\text{where: } A = \begin{bmatrix} 0 & 1 & 0 \\ 0 & c_1 & c_2 \\ 0 & c_3 & c_4 \end{bmatrix}, B = \begin{bmatrix} 0 \\ 0 \\ c_5 \end{bmatrix},$$

$$c_1 = -\frac{R_p}{m_p}, c_2 = \frac{A_p}{m_p}, c_3 = -\frac{EA_p}{V_t}, c_4 = -\frac{E}{V_t}(k_{cl} + 2C_V), c_5 = \frac{E}{V_t}k_{ql}$$

$k_{ql}$ is a flow gain, $k_{cl}$ is a system flow-pressure coefficient, $C_t$ is a hydraulic fluid leakage coefficient, and u is a system input steering wheel angle;

an observer state equation used is as follows:

$$\dot{\hat{x}} = A\hat{x} + Bu + He \tag{5}$$

Where: $e$ is an error between the system's true state variable and the observer's estimated state, $H$ is an coefficient of the observer, also known as an observation matrix, $H=[H_1\ H_2\ H_3\ H_4]^T$;

assuming desired pole positions of a load force observation system are $p_1$, $p_2$, $p_3$, $p_4$, values of parameters $H_1$, $H_2$, $H_3$, $H_4$ should satisfy:

$$|sI-A|=\prod_{i=1}^{n+1}(s-p_i) \tag{6}$$

$$(s-p_1)(s-p_2)(s-p_3)(s-p_{4)})=0 \tag{7}$$

by equating the coefficients of each term of the polynomial for s, values of the parameters are determined:

$$H_1=c_1-p_1-p_2-p_3-p_4+c_4 \tag{8}$$

$$H_2=H_1\cdot c_1+H_1\cdot c_4+p_1\cdot p_2+c_2\cdot c_3+p_4\cdot(p_1+p_2+p_3)+p_3\cdot(p_1+p_2)$$

$$H_3=\{H_2\cdot c_4-H_4\cdot c_3-p_4\cdot[p_1\cdot p_2\cdot p_3\cdot(p_1+p_2)]+H_1\cdot c_2\cdot c_3-p_1\cdot p_2\cdot p_3\}/c_2$$

$$H_4=-p_1\cdot p_2\cdot p_3\cdot p_4/(c_3\cdot c_4).$$

* * * * *